Jan. 23, 1934.  H. D. STEVENS  1,944,767
METHOD AND APPARATUS FOR MOUNTING EXPANSIBLE CORES IN TIRE CASINGS
Filed March 28, 1931  4 Sheets-Sheet 1
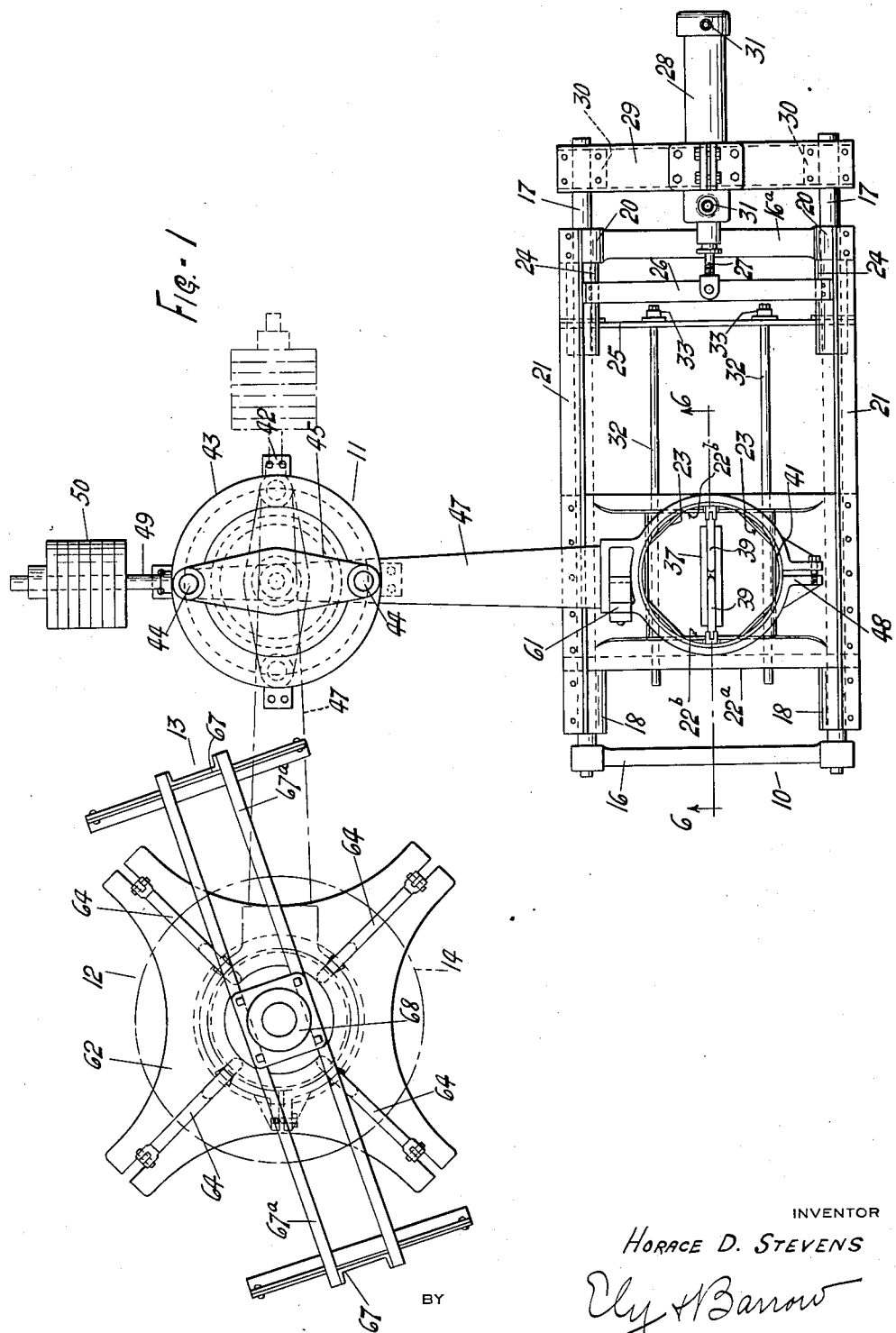
INVENTOR
HORACE D. STEVENS
BY
Ely H Barrow
ATTORNEYS Jan. 23, 1934.  H. D. STEVENS  1,944,767
METHOD AND APPARATUS FOR MOUNTING EXPANSIBLE CORES IN TIRE CASINGS
Filed March 28, 1931  4 Sheets-Sheet 2
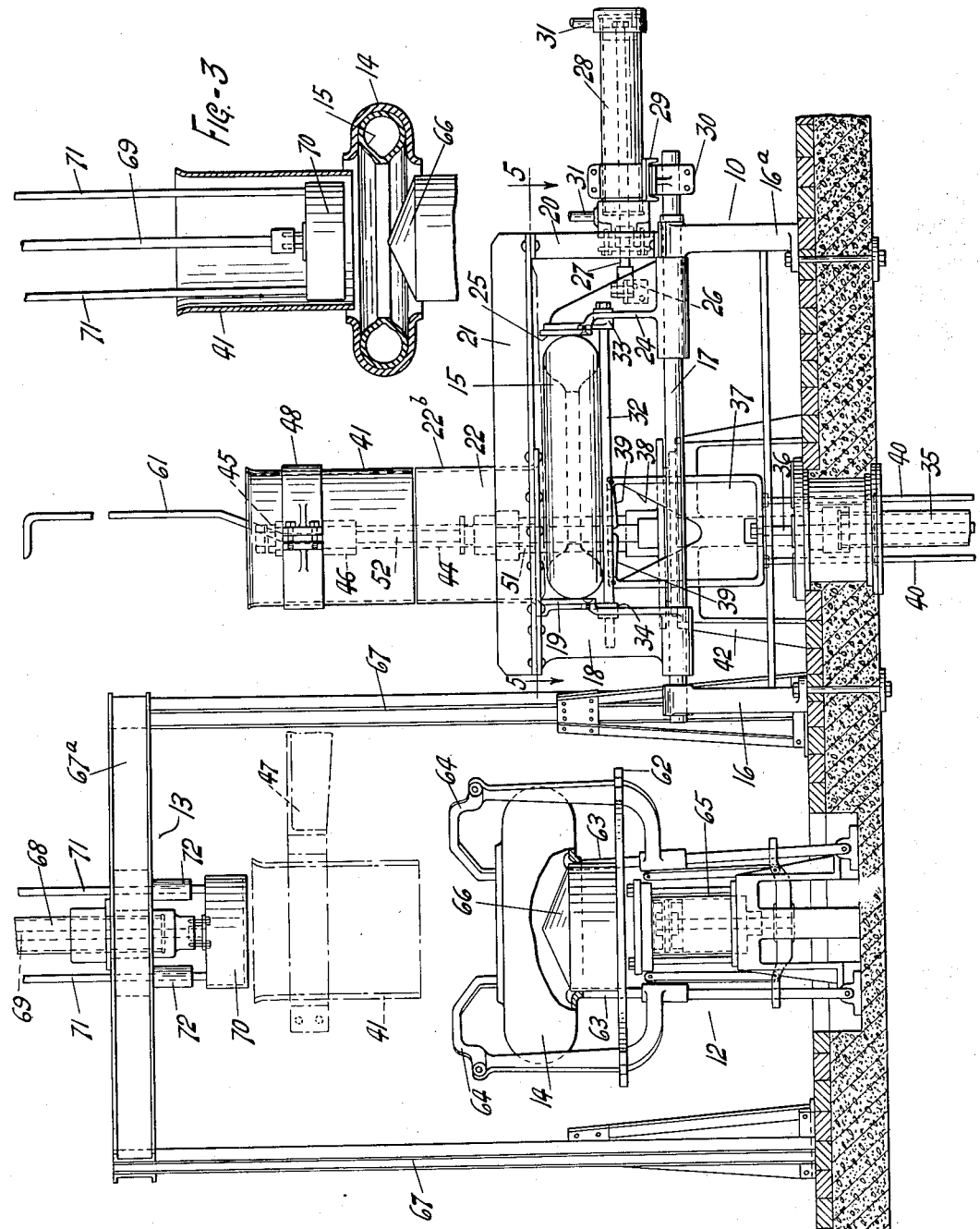
INVENTOR
HORACE D. STEVENS
BY
Ely & Barrow
ATTORNEYS Jan. 23, 1934. H. D. STEVENS 1,944,767
METHOD AND APPARATUS FOR MOUNTING EXPANSIBLE CORES IN TIRE CASINGS
Filed March 28, 1931 4 Sheets-Sheet 3
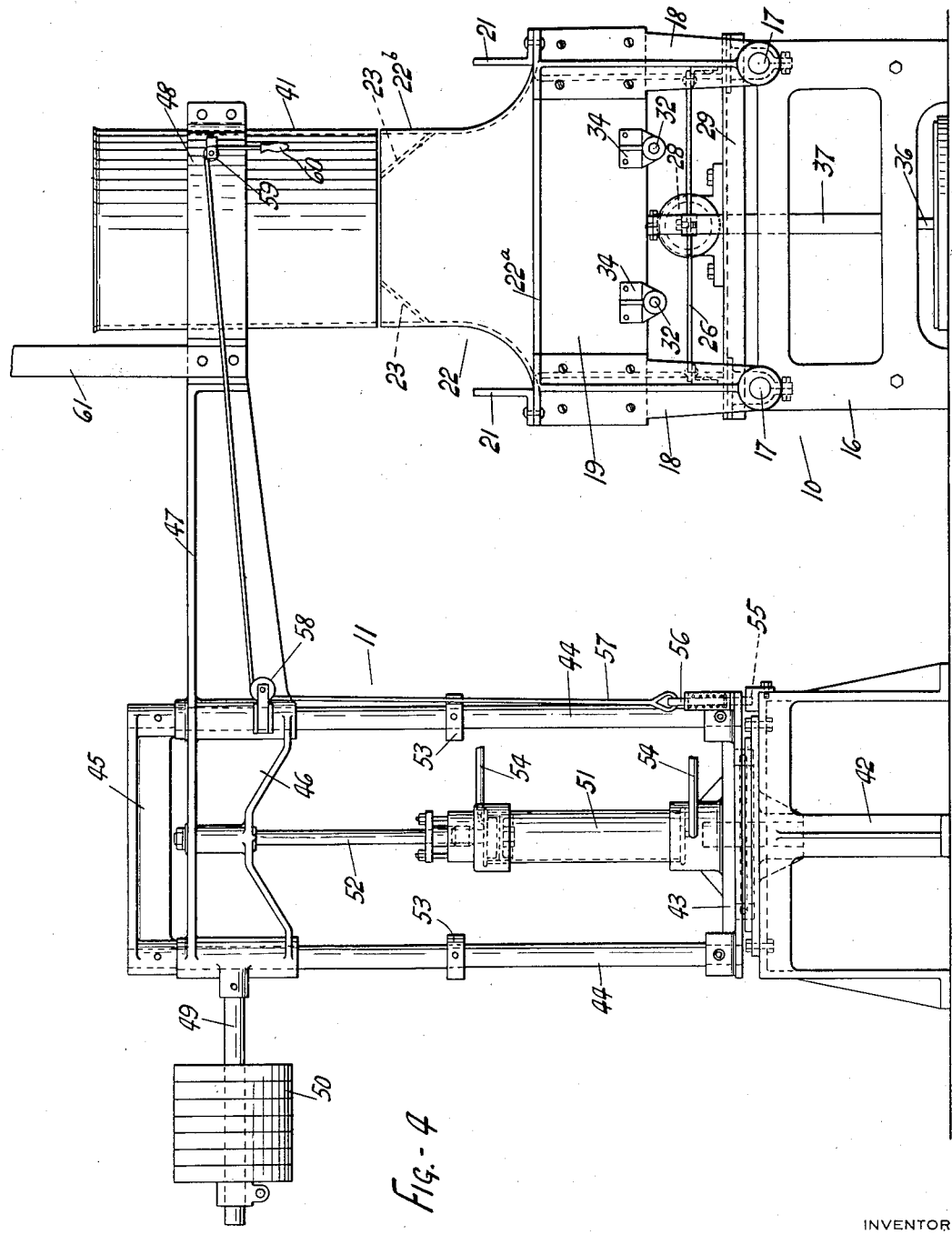
INVENTOR
HORACE D. STEVENS
BY
ATTORNEYS Jan. 23, 1934.  H. D. STEVENS  1,944,767

METHOD AND APPARATUS FOR MOUNTING EXPANSIBLE CORES IN TIRE CASINGS

Filed March 28, 1931  4 Sheets-Sheet 4

INVENTOR
HORACE D. STEVENS

ATTORNEYS

Patented Jan. 23, 1934

1,944,767

UNITED STATES PATENT OFFICE 1,944,767

METHOD AND APPARATUS FOR MOUNTING EXPANSIBLE CORES IN TIRE CASINGS

Horace D. Stevens, Akron, Ohio, assignor to The Firestone Tire & Rubber Company, Akron, Ohio, a corporation of Ohio Application March 28, 1931. Serial No. 525,994

7 Claims. (Cl. 18—2)

This invention relates to methods and apparatus for mounting expansible cores in tire casings.

The invention is of especial utility in the mounting of expansible cores or water bags in unvulcanized tires of large size, which tires have relatively small bead diameter as compared to the cross-sectional diameter of the tire, with the result that manual mounting of the cores in the tires is an arduous task requiring several operatives. Apparatus heretofore provided for mounting expansible cores in tires usually folded a core in its own plane, which was practical procedure when the cores were to be mounted in small size tires of relatively large bead diameter, but which does not sufficiently reduce the diameter of large size cores to permit them to be mounted in large tires of samll bead diameter.

The chief objects of this invention are to provide improved procedure for mounting annular expansible cores in tire casings; and to provide improved apparatus for practicing said method. Further objects include economy of time and labor; and avoiding the necessity of straining and unduly deforming the tire in the mounting of a core therein.

Of the accompanying drawings:

Figure 1 is a plan view of apparatus embodying and adapted to carry out the invention, in its preferred form;

Figure 2 is a side elevation of the apparatus as viewed from the near side of Figure 1;

Figure 3 is a fragmentary detail section of a tire casing and expansible core therein, and associated core-mounting members as they appear at the moment the core is mounted in the tire;

Figure 4 is an end elevation of part of the apparatus shown in Figure 1, as viewed from the left thereof, the tire-opening device being omitted;

Figure 5:
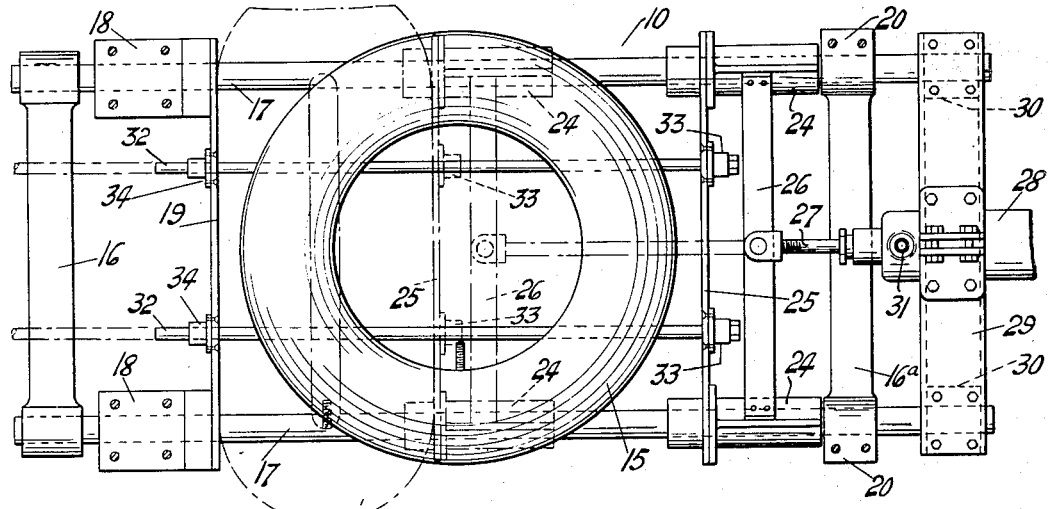
Figure 5 is a section on the line 5—5 of Figure 2.

Referring to Figure 1 of the drawings, the improved apparatus embodying the invention comprises a core-folding device 10 adapted to fold an expansible core and to pack it into a suitable mobile receptacle, a transfer device 11 which supports said receptacle and is adapted alternatively to position said receptacle over the core-folding device 10 and over a tire-opening device 12, and an ejecting device 13 for pushing the folded core out of the receptacle into an open tire on the tire-opening device. The tire-opening device 12 may be of any suitable construction for opening a tire while the same is positioned in a horizontal plane, but preferably it is of the general construction shown in the patent to William C. Stevens, No. 1,288,733, issued December 24, 1918. The work comprises an unvulcanized penumatic tire casing 14, and an annular expansible core 15 that is folded and then mounted in the tire by the apparatus shown.

The core-folding device 10 comprises a pair of spaced-apart end-frames 16, 16a rising from the floor and carrying between them a pair of parallel horizontal slide-bars 17, 17. Adjustably mounted upon each of the latter, adjacent the end-frame 16, is an upright bracket 18, and said brackets support a vertically positioned abutment plate 19 that extends transversely of the machine.

Rising from the end-frame 16a at opposite sides of the machine are respective angular brackets 20, 20, and connecting the tops of said brackets to the tops of respective brackets 18 are parallel angles 21, 21. The latter support a guide 22 that comprises a base-plate 22a that extends transversely of the machine and is secured to the under side of said angles, and an integral hollow, generally-square guiding member 22b extending upwardly therefrom. The guide 22 is positioned at one end of the machine, adjacent the brackets 18 as shown, and the guiding member 22b has corner plates 23, 23 at its open upper end so that the aperture therein is octagonal in shape.

Slidably mounted upon the bars 17 are respective slide-brackets 24, 24 which are connected by an abutment plate 25 that is disposed in a vertical plane, and a plate 26 to the central region of which is connected the outer end of the piston rod 27 of a double-acting fluid-pressure cylinder 28. The latter is mounted upon a support 29 that extends transversely of the machine and has its end portions resting upon suitable brackets 30, 30 that are mounted upon the respective slide-bars 17. The cylinder 28 is provided at its opposite ends with the usual fluid inlet-and-outlet pipes 31, 31 by which the cylinder is operated to project and retract its piston rod 27 whereby the slide-brackets 24 are reciprocated upon the bars 17 and the abutment plate 25 is moved toward and away from the stationary abutment plate 19. A pair of parallel, horizontal slide-rods 32, 32 are secured at one of their ends in respective brackets, such as the bracket 33, mounted upon the lower marginal portion of the abutment plate 25, the other ends of said rods 32 sliding freely through respective brackets 34, 34 mounted upon the stationary abutment plate 19 at the lower margin thereof. The slide-rods 32 constitute a support for the expansible core 15 in the initial operation of folding the same.

Mounted below the floor under the machine 10, in axial alignment with the guide 22 is a fluid pressure cylinder 35, the piston rod 36 of which extends upwardly and has its outer end provided with an upwardly extending yoke 37 which is generally planar in form, and is disposed in a vertical plane parallel to the rods 32 and between the latter. The yoke 37 is formed with a deep notch 38 in the middle of its upper margin, and at the respective upper corners of the yoke are pivoted fingers 39, 39 which normally extend toward each other horizontally over the notch 38, and are so mounted as to be capable of upward pivotal movement. Downwardly extending guide rods 40, 40 are connected to the yoke 37 for preventing angular movement thereof on the piston rod 36.

Figure 7:
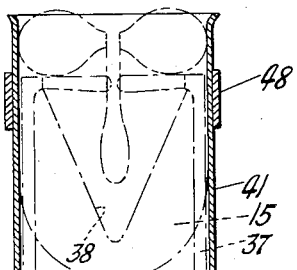
Figure 7 is a detail elevation of an expansible core as it appears when folded, ready to be mounted in a tire.
Figure 6:
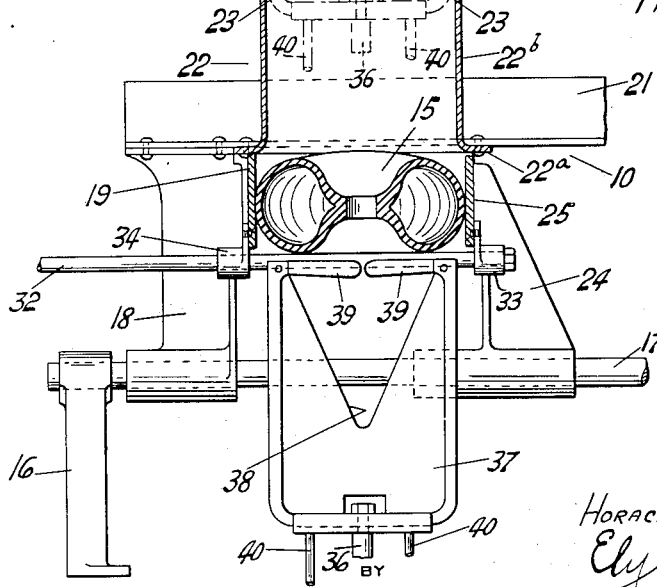
Figure 6 is a section on the line 6—6 of Figure 1.

The mechanism described is adapted to fold the expansible core 15 twice so that it assumes the shape shown in full lines in Figure 7 and in broken lines in Figure 6, and in so shaping said core the yoke 37 pushes the same upwardly through the guide 22 and into a mobile receptacle 41 that is positioned over the guide 22, said receptacle constituting a part of the transfer device 11.

Referring especially to Figure 4 of the drawings, the transfer device 11 comprises a base 42 and swiveled upon suitable bearings on the top thereof is a turntable or turret 43. Rising from diametrically opposed points on the latter are two posts 44, 44, the upper ends of which are connected by a yoke 45. Slidably mounted for vertical movement upon the posts 44 is a bracket 46 comprising a laterally extending arm 47, the free end of which carries a collar-like clamp 48 which embraces and supports the receptacle 41. Projecting from the bracket 46 on the opposite side thereof from the arm 47 is an arm 49 that carries a counter-weight 50. Axially mounted upon the turntable 43 is a vertical, two-way, fluid-pressure cylinder 51, the piston rod 52 of which extends upwardly and has its outer end connected to the bracket 46, for raising and lowering the same, the upward movement of the bracket being limited by the yoke 45 and the downward movement thereof being limited by respective stop-collars 53, 53 mounted upon the posts 44.

The cylinder 51 is provided at its opposite ends with fluid-inlet-and-outlet pipes 54, 54, which pipes are flexible so as to permit rotary movement of the turntable.

The transfer device is provided with means for positioning the arm 47 thereof alternatively in determinate positions whereby the receptacle 41 is axially aligned either with the guide 22 of the core-folding device or with a tire 14 mounted upon the tire opening device 12. For positioning the receptacle 41 over the guide 22 as shown in Figures 1, 2, 4, and 6, the base 42 is formed in its upper face with a recess 55 which receives a spring-pressed detent 56 carried by the turntable 43, and a cable 57 is connected to said detent and is trained over sheaves 58 and 59, the latter being mounted upon the outer end of the arm 47, the end of the cable being provided with a handle 60. The arrangement is such that the operator of the core-folding device 10 can unlatch the detent 56, and, by pushing the receptacle 41, swing the same and the arm 47 toward their alternative positions. An upwardly extending stop-bracket 61 is mounted upon the arm 47, and is positioned thereon so as to engage a part of the structure of the ejecting device 13, when the receptacle 41 is moved toward the tire-opening device 12, whereby the receptacle is accurately positioned in axial alignment with said tire-opening device.

The tire-opening device 12 comprises a table 62, an annular series of pivotally mounted arms 63, 63 adapted to engage the lower bead of a tire 14 on the table 62, a similar series of arms 64, 64 adapted to engage the upper bead of the said tire 14, said arms 63, 64 being movable relatively of each other to open the tire, and a fluid-pressure cylinder 65 for effecting such relative movement of the arms 63, 64. An axial conical guide 66 is mounted upon the table 62 within the arms 63, said guide being of such height as to extend into the tire 14 when the latter is opened. The purpose of the guide 66 is to spread or unfold the core 15 when the latter is forced from the receptacle 41 into the tire.

The ejecting device 13 comprises a pair of uprights or standards 67, 67 positioned on opposite sides of the tire-opening device 12, and so arranged as not to interfere with the arm 47 in placing the receptacle 41 over the device 12. Horizontal supporting members 67ª, 67ª connect the upper ends of the standards 67 and support a vertically positioned fluid pressure cylinder 68 disposed coaxially of the tire-opening device 12. The piston rod 69 of the cylinder 68 projects downwardly, and its lower end is provided with an annular cap or plunger 70 of somewhat smaller diameter than the inside diameter of the receptacle 41. Guide rods 71, 71 are slidably mounted in brackets 72, 72 carried by the supports 67ª, the lower ends of said guide rods being secured to the plunger 70.

For the operation of the apparatus one operator is required for operating the core folding device 10, and one operator is required for operating the tire opening device 12, transfer device 11, and ejecting device 13. With the core folding device 10 in the inoperative position shown in the drawings, and the receptacle 41 of the transfer device positioned over the guide 22 as shown, an expansible core 15 is mounted upon the slide-rods 32 of the folding device, and the rear end of the cylinder 28 charged so as to move the brackets 24 to the left as viewed in Figures 1, 2 and 5 whereby the core is moved against the abutment plate 19 and confined between the latter and the abutment plate 25, the pressure of the latter distorting the core in its own plane and causing it to assume the elliptical shape shown in broken lines in Figure 5. In this position the medial portion of the core is below the open lower end of the guiding member 22ᵇ, as is clearly shown in Figure 6, the respective ends of the ellipse being disposed beneath the base plate 22ª of the guide.

The lower end of the cylinder 35 is then charged, which causes the yoke 37 to rise and the fingers 39 of the yoke to engage the core centrally and transversely thereof, with the result that the core is folded or doubled and borne upwardly through the guide 22 into the receptacle 41, as is most clearly shown in Figure 6. The cylinder 35 is then reversed to lower the yoke 37, the core remaining within the receptacle by reason of its strong frictional engagement with the wall thereof. The cylinder 28 is then reversed to restore the folding device to normal inoperative position. The operator of the folding device then pulls upon the cable 57 to unlatch the transfer device 11, and then pushes the receptacle 41 to cause its supporting arm 47 to carry it, in the direction indicated by the arrow in Figure 1, into axial alignment with the tire-opening device 12, at the elevation shown in broken lines in Figure 2, the receptacle being determinately positioned by reason of the stop-bracket 61 coming into contact with one of the supporting members 67$^a$.

During the interval required to complete the foregoing operations, the operator of the tire-opening device 12 has mounted a tire 14 upon the table 62 and actuated the cylinder 65 to cause the arms 63, 64 to engage the bead portions of the tire 14 and spread them apart, substantially as shown in Figures 2 and 3. As soon as the receptacle 41 is positioned over the tire, the same operator operates the cylinder 51 to retract its piston rod 52 and thereby to lower the arm 47 and receptacle 41, the latter coming to rest with its lower end inside the upper tire bead, as shown in Figure 3. The operator then operates the cylinder 68 to cause it to move the plunger 70 downwardly, through the receptacle 41, with the result that the core 15 is ejected from the bottom of the receptacle and projected into the tire 14, the conical guide 66 in the latter serving to assist the core in resuming its normal plane form, snugly within the tire as is shown in Figure 3.

The cylinders 68, 51, and 65 are then successively reversed in the order named to lift the plunger 70, raise the receptacle 41, and to release the tire 14 which may then be removed. The receptacle is then swung toward the core folding device 10, and is locked in proper position over the guide 22 thereof when the detent 56 of the transfer device drops into the recess 55 therein. This completes one cycle of operations which may then be repeated as described.

The invention results in more rapid mounting of large size expansible cores in tire casings, and accomplishes the other objects set forth in the foregoing statement of objects.

Modifications may be resorted to within the scope of the appended claims which are not limited wholly to the specific construction shown or exact procedure described.

What is claimed is:

1. The method of mounting flexible cores in tire casings which comprises folding a core in quarters in a double plane, spreading apart the beads of a tire which is disposed at right angles to the planes of the folded core, and then bringing the tire and core together and mounting the core in the tire.

2. The method of mounting flexible cores in tire casings which comprises folding a core into quarters in two parallel planes, spreading apart the beads of a tire at a station removed therefrom, transferring the core while so folded to the tire spreading station, and then mounting the core of the tire while the latter is held in a plane at right angles to the planes of the folded core.

3. Apparatus for mounting flexible cores in tires, said apparatus comprising a core-folding device comprising means for deforming a circular core to elliptical shape in the plane of the core, means for doubling the core thus deformed out of the original plane of the core, and means for inserting the core thus doubled into a tire.

4. Apparatus for mounting flexible cores in tires, said apparatus comprising a core-folding device comprising a support for a core, a stationary abutment at one side thereof, a movable abutment at the other side thereof, means for moving the movable abutment toward the stationary abutment to deform a circular core therebetween to elliptical shape in the plane of the core, means for folding the elliptical shaped core double outside of the original plane of the core and means for inserting the core into a tire while it is so deformed.

5. Apparatus for mounting flexible cores in tires, said apparatus comprising a core-folding device including a support for a circular core, a tubular guide above said support, means for deforming the core to elliptical shape while on said support, and means for lifting the core from its support and so passing it into the tubular guide as to double it, and means for ejecting the core from the tubular guide into a tire.

6. Apparatus for mounting flexible cores in tires, said apparatus comprising a core-folding device including a support for a circular core, means for deforming the core to elliptical shape while on said support, a tubular guide adjacent said support, said guide being of smaller diameter than the long diameter of the deformed core, and means for forcing the middle thereof into the guide whereby the core is doubled, and means for ejecting the core from the tubular guide into a tire.

7. In a core-folding device, the combination of an open support for a circular core, means for exerting radial pressure against opposite sides of said core to deform it to elliptical shape, a tubular guide above said support, and means operating through said support for doubling the core by forcing the middle thereof upwardly into the tubular guide.

HORACE D. STEVENS.